Feb. 4, 1964  G. USTIN  3,120,023
FLUTED SPLICE CAP
Filed Nov. 21, 1960

INVENTOR.
GEORGE USTIN
BY
ATTORNEY

United States Patent Office 3,120,023
Patented Feb. 4, 1964

3,120,023
FLUTED SPLICE CAP
George Ustin, Verona, N.J., assignor to Buchanan Electrical Products Corporation, Hillside, N.J., a corporation of New Jersey
Filed Nov. 21, 1960, Ser. No. 70,749
2 Claims. (Cl. 16—108)

This invention relates to electrical fittings and particularly to an improved construction for a deformable splice cap employable in the formation of crimped connections.

Deformable splice caps in the form of relatively small thin walled and smooth surfaced sleeves of highly ductile conducting metallic material are conventionally employed in the formation of so called "pigtail" type electrical connections. In the formation of such connections, a plurality of exposed wire ends are inserted into a splice cap and the workpiece as so formed is placed in a crimping tool wherein a plurality of radially advanceable crimping dies desirably operate to deform the splice cap and the contained lead ends into intimate mechanical and electrical engagement with each other.

Difficulties, particularly in the form of loosely secured leads, have been encountered in the utilization of such conventionally constructed splice caps occasioned by lead migration, during deformation, into the relatively undeformed peripheral areas intermediate the crimping die indentations. Such lead migration is facilitated by the relatively sharp and well defined crimping indentations resulting from the soft and highly ductile character of the conventionally constructed splice caps. Attempts have been made to overcome this difficulty by increasing the hardness of the splice caps, with a consequent lessening in ductility, which results in a reduced definition of the crimping indentations and in a greater area of peripheral splice cap deformation. Such expedients, however, have only lessened, and not eliminated, the difficulty and the limited success thereof was more than counterbalanced by the undesirable additional resistance to ease the crimpability inherent therein.

This invention may be briefly described as an improved construction for splice caps that provides a greater degree of rigidity without any reduction in ductility and which markedly limits undesired lead migration during crimping deformation thereof to the end of minimizing, if not practically eliminating, loose leads in the formation of electrical connections therefrom.

The primary object of this invention is the provision of an improved electrical fitting.

Another object of this invention is the provision of an improved construction of deformable splice cap employable in the formation of crimped electrical connections.

Other objects and advantages of the invention will be pointed out in the following specification and claims and will be apparent from the accompanying drawings which disclose the principles of the invention and illustrate a presently preferred construction for a splice cap that incorporates those principles.

Referring to the drawings.

Figure 1:
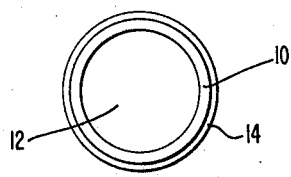
FIGURE 1 is a plan view of a splice cap of conventional construction.

Referring to FIGURE 1, there is illustrated a conventional splice cap in the form of a thin walled, smooth surfaced sleeve 10 of a soft and highly ductile conducting metallic material, suitably soft copper or steel. The sleeve 10 defines a bore 12 sized to receive the insulation stripped ends of a plurality of wire leads and is terminated at one end by an extending peripheral flange 14 for adding rigidity to said sleeve 10 and to facilitate wire entry into the bore thereof.

Figure 2:
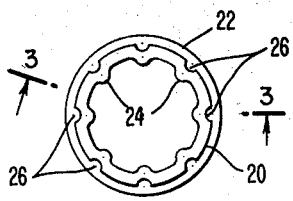
FIGURE 2 is a plan view of a splice cap incorporating the principles of this invention.
Figure 3:
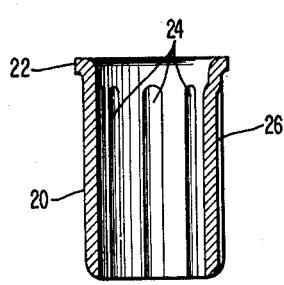
FIGURE 3 is a vertical section on the line 3—3 of FIGURE 2.

As shown in FIGURES 2 and 3, in the splice cap construction incorporating the principles of this invention there is provided a thin walled cylindrical sleeve formed of soft and highly ductile conducting metallic material, suitably soft copper, having an elongate body portion 20 provided with an extending peripheral flange 22 at one end thereof. The body portion 20 is provided, at least over the major portion of its length, with a plurality of elongate, circumferentially spaced and longitudinally disposed inwardly protruding rounded ribs 24 on the inner surface thereof. Such ribs 24 are readily formed by fluting the body portion 20 which provides, in the illustrated preferred embodiment, a plurality of substantially complementally shaped longitudinally disposed recesses 26 on the outer sleeve surface. The illustrated ribs 24 and recesses 26 serve to give the body portion 20 of the sleeve a greater degree of rigidity without any loss in the ductility thereof.

Such flutes, providing the ribs 24 and recesses 26, should be even in number, preferably eight, as in the illustrated preferred embodiment, and should be uniformly spaced on the sleeve circumference. The inwardly protruding ribs 24 are of relatively slight radial extent and preferably should not extend, in the radial direction, more than 15% of the distance intermediate the inner sleeve surface and the longitudinal axis of the sleeve.

In the formation of electrical connections utilizing the subject construction a plurality of insulation stripped wire ends 30 are inserted into the sleeve through the flanged opening 32 therein. The workpiece so formed is then inserted into the bore of a crimping tool and subjected to the deforming action of a plurality of radially advancing crimping die members. The plurality of recesses 26 disposed on the outer sleeve surfaces form a self-aligning function in that the advancing crimping dies are apparently directed into said recesses 26 which thereby serve as foci for crimping die pressure application. The symmetric arrangement of the internally disposed ribs, in addition to initially serving to confine the contained conductors and thereby locate the same more closely adjacent to the longitudinal axis of the sleeve also serve to provide inwardly protruding abutments intermediate the points of crimping die pressure application. During the period of deforming pressure application the presence of these intermediately disposed abutments serves to prevent wire displacement or migration into the relatively undeformed peripheral areas intermediate the crimping die indentation and thereby materially contribute to the insuring of lead wire deformation and resulting desired intimate mechanical and electrical interengagement of the splice cap and contained leads.

Figure 5:
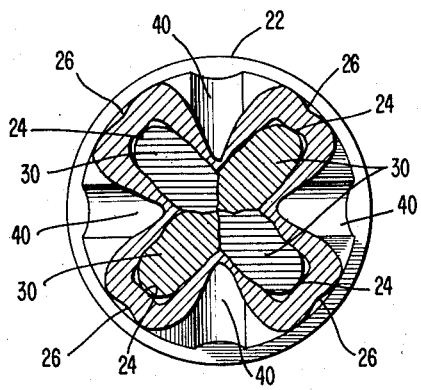
FIGURE 5 is a section on the line 5—5 of FIGURE 4.
Figure 4:
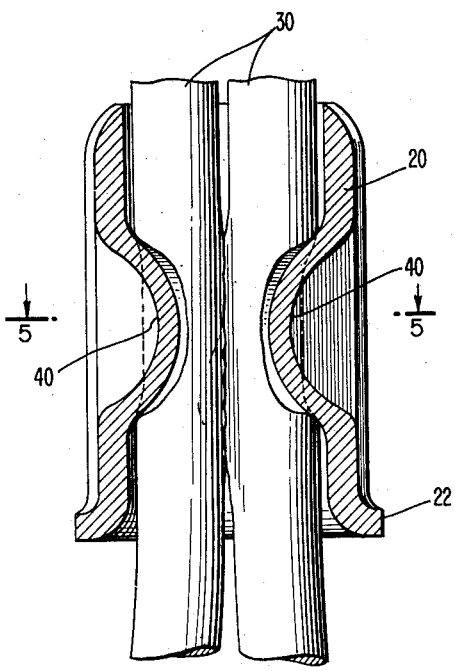
FIGURE 4 is an enlarged and somewhat idealized sectional view of a splice cap constructed in accordance with the principles of this invention in lead containing and deformed condition.
Figure 6:
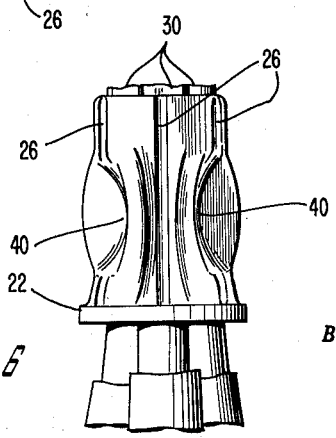
FIGURE 6 is a side elevation of a pigtail type connection formed by a crimping deformation of a splice cap constructed in accordance with the principles of this invention.

FIGURES 4, 5 and 6 illustrate, in somewhat idealized form, the deformation of the subject splice cap and contained leads by a crimping tool conventionally employing four radially advanceable crimping die members. As mentioned earlier, the externally disposed recesses function to make the workpiece self-aligning and serve as foci for crimping die pressure application. Such pressure application results in indentive deformation 40 of the body portion 20 of the sleeve. The inwardly protruding rib members 24 disposed intermediate the points of applied pressure provide prelocated lead abutting surfaces which are of sufficient strength and rigidity to limit wire migration during the initial stages of pressure application at least to such an extent as to assure wire deformation by the advancing crimping dies during the subsequent stages of pressure application as illustrated in FIGURE 5.

Having thus described my invention, I claim:

1. A splice cap construction comprising a thin walled, open ended, cylindrically shaped conducting metallic sleeve having a body portion and an outwardly directed peripheral flange at one end thereof, said body portion being longitudinally fluted over a major portion of its length to provide a plurality of elongate circumferentially spaced inwardly protruding rounded ribs on the inner surface and a plurality of substantially complementally shaped elongate longitudinal recesses on the outer surface thereof for receiving advancing crimping die members in a deforming operation.

2. The splice cap construction as set forth in claim 1 wherein said inwardly protruding rounded ribs are uniformly spaced to restrict outward displacement of contained lead elements during deformation operations.

References Cited in the file of this patent

UNITED STATES PATENTS

| | | |
|---|---|---|
| 1,298,255 | Pieper | Mar. 25, 1919 |
| 1,560,316 | Prince | Nov. 3, 1925 |
| 2,589,368 | Graham et al. | Mar. 18, 1952 |
| 2,604,508 | Bergan | July 22, 1952 |
| 2,674,725 | Buchanan | Apr. 6, 1954 |
| 2,832,118 | Ehmann | Apr. 29, 1958 |